United States Patent [19]

Mouri et al.

[11] Patent Number: 5,487,520
[45] Date of Patent: Jan. 30, 1996

[54] POWER SEAT SLIDE DEVICE

[75] Inventors: Takayuki Mouri; Tohru Isomura, both of Ayase, Japan

[73] Assignee: Ikeda Bussan Co., Ltd., Ayase, Japan

[21] Appl. No.: 74,444

[22] Filed: Jun. 10, 1993

[30] Foreign Application Priority Data

Sep. 25, 1992 [JP] Japan ................. 4-067007 U

[51] Int. Cl.$^6$ ................. F16M 13/00
[52] U.S. Cl. ................. 248/429; 297/344.1
[58] Field of Search ................. 248/429, 424, 248/609; 297/330, 344.1, 344.11

[56] References Cited

U.S. PATENT DOCUMENTS

| | | | |
|---|---|---|---|
| 2,929,439 | 3/1960 | Tanaka et al. | 297/330 |
| 2,964,093 | 12/1960 | Lohr et al. | 248/429 |
| 3,022,976 | 2/1962 | Zia | 248/430 |
| 3,405,900 | 1/1968 | Robinson | 297/330 |
| 4,611,778 | 9/1986 | Werner et al. | 248/429 |
| 4,672,858 | 6/1987 | Langowski | 74/424.8 R |
| 4,805,866 | 2/1989 | Aihara et al. | 248/429 |
| 5,222,402 | 6/1993 | White et al. | 248/429 X |
| 5,259,257 | 11/1993 | Mouri | 248/429 X |

FOREIGN PATENT DOCUMENTS

| | | | |
|---|---|---|---|
| 48238 | 3/1984 | Japan | 248/429 |
| 2160949 | 1/1986 | United Kingdom. | |

*Primary Examiner*—Ramon O. Ramirez
*Assistant Examiner*—Korie H. Chan
*Attorney, Agent, or Firm*—Foley & Lardner

[57] ABSTRACT

A power seat slide device comprises a lower rail; an upper rail slidably engaged with the lower rail; an elongate threaded bolt member rotatably carried by the upper rail through first and second supporting members; a nut member connected to the lower and rail and meshed with the bolt member so that rotation of the bolt member about its axis induces a longitudinal movement of the upper rail relative to the lower rail; an electric power device for rotating the bolt member with an aid of electric power; a front shock absorbing member slidably mounted on the bolt member between the first supporting member and the nut member; and a rear shock absorbing member slidably mounted on the bolt member between the second supporting member and the nut member. When the upper rail moves to its rearmost position relative to the lower rail, the front shock absorbing member is compressed by the first supporting member and the nut member, and when the upper rail moves to its frontmost position relative to the lower rail, the rear shock absorbing member is compressed by the second supporting member and the nut member.

10 Claims, 3 Drawing Sheets

POWER SEAT SLIDE DEVICE

BACKGROUND OF THE INVENTION

1. Field of the Invention

The present invention relates in general to power seat slide devices for motor vehicles or the like and more particularly to automotive power seat slide devices of a type which comprises two lower rails which are unmovably mounted on a vehicle floor, two upper rails which are slidably engaged with the lower rails and support thereon a seat, and an electric power device which moves the upper rails to a desired fore-and-aft position relative to the lower rails with an aid of electric power.

2. Description of the Prior Art

In order to clarify the task of the present invention, one conventional power seat slide device of the above-mentioned type will be described with reference to FIG. 6 of the accompanying drawings.

The conventional power seat slide device generally comprises two rail units which are substantially the same in construction. As is understood from the drawing (viz., FIG. 6), each rail unit includes a lower rail 1 which is unmovably mounted on a vehicle floor "F", an upper rail 5 which is slidably engaged with the lower rail 1 and front and rear rollers 8a and 8b which are put between the lower and upper rails 1 and 5 to smooth the movement of the upper rail 5 relative to the lower rail 1. Although not shown in the drawing, a seat is mounted on the upper rails, so that movement of the upper rails 5 relative to the lower rails induces movement of the seat in the same direction relative to the vehicle floor "F".

Each lower rail 1 has first and second spaced front stoppers 2a and 2b and first and second spaced rear stoppers 2c and 2d secured thereto, and similar to this, each upper rail 5 has first and second spaced front stoppers 6a and 6b and first and second spaced rear stoppers 6c and 6d secured thereto. As shown, the front roller 8a is arranged to roll between the first front stopper 2a and the first rear stopper 2c and the rear roller 8b is arranged to roll between the second front stopper 2b and the second rear stopper 2d. When the upper rail 5 assumes its rearmost position as shown in the drawing, the first rear stopper 6c of the upper rail 5 presses the front roller 8a against the first rear stopper 2c of the lower rail 1 and at the same time, the second rear stopper 6d of the upper rail 5 presses the rear roller 8b against the second rear stopper 2d of the lower rail 1 thereby to achieve an assured stopping of the upper rail 5 at such extreme position. While, when the upper rail 5 assumes its frontmost position, the first front stopper 6a of the upper rail 5 presses the front roller 8a against the first front stopper 2a of the lower rail 1 and at the same time, the second front stopper 6b of the upper rail 5 presses the rear roller 8b against the second front stopper 2b of the lower rail 1.

However, due to inevitable dimensional error of constituent parts and inevitable assembly error, the two rail units of the above-mentioned conventional power seat slide device have failed to have a satisfied symmetrization therebetween, which causes a marked sway of the seat at the frontmost or rearmost position. Furthermore, marked shock has been produced when the seat is moved to the frontmost or rearmost position. As is known, the sway of the seat and the shock produced during the adjustment movement of the seat gives uncomfortable feeling to a seat occupant.

SUMMARY OF THE INVENTION

It is therefore an object of the present invention to provide a power seat slide device which is free of the above-mentioned undesired sway of the seat.

According to a first aspect of the present invention, there is provided a power seat slide device which comprises a lower rail secured to a fixed member; an upper rail slidably engaged with the lower rail; an elongate threaded bolt member which is rotatably carried by one of the lower and upper rails through first and second supporting members; a nut member connected to the other of the lower and upper rails, the nut member being meshed with the bolt member so that rotation of the bolt member about its axis induces a longitudinal movement of the upper rail relative to the lower rail; an electric power device for rotating the bolt member with an aid of electric power; a first shock absorbing member which is slidably mounted on the bolt member between the first supporting member and the nut member; and a second shock absorbing member which is slidably mounted on the bolt member between the second supporting member and the nut member, wherein when the upper rail moves to one end position relative to the lower rail, the first shock absorbing member is compressed by the first supporting member and the nut member, and when the upper rail moves to the other end position relative to the lower rail, the second shock absorbing member is compressed by the second supporting member and the nut member.

According to a second aspect of the present invention, there is provided a power seat slide device which comprises left and right rail units, each including a lower rail secured to a fixed member; an upper rail slidably engaged with the lower rail; an elongate threaded bolt member which is rotatably carried by one of the lower and upper rails through first and second supporting members; a nut member connected to the other of the lower and upper rails and meshed with the bolt member so that rotation of the bolt member about its axis induces a longitudinal movement of the upper rail relative to the lower rail; a first shock absorbing member which is slidably mounted on the bolt member between the first supporting member and the nut member; and a second shock absorbing member which is slidably mounted on the bolt member between the second supporting member and the nut member, wherein when the upper rail moves to one end position relative to the lower rail, the first shock absorbing member is compressed by the first supporting member and the nut member, and when the upper rail moves to the other end position relative to the lower rail, the second shock absorbing member is compressed by the second supporting member and the nut member; and a single electric power device for rotating the bolt members of the left and right rail units with an aid of electric power.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
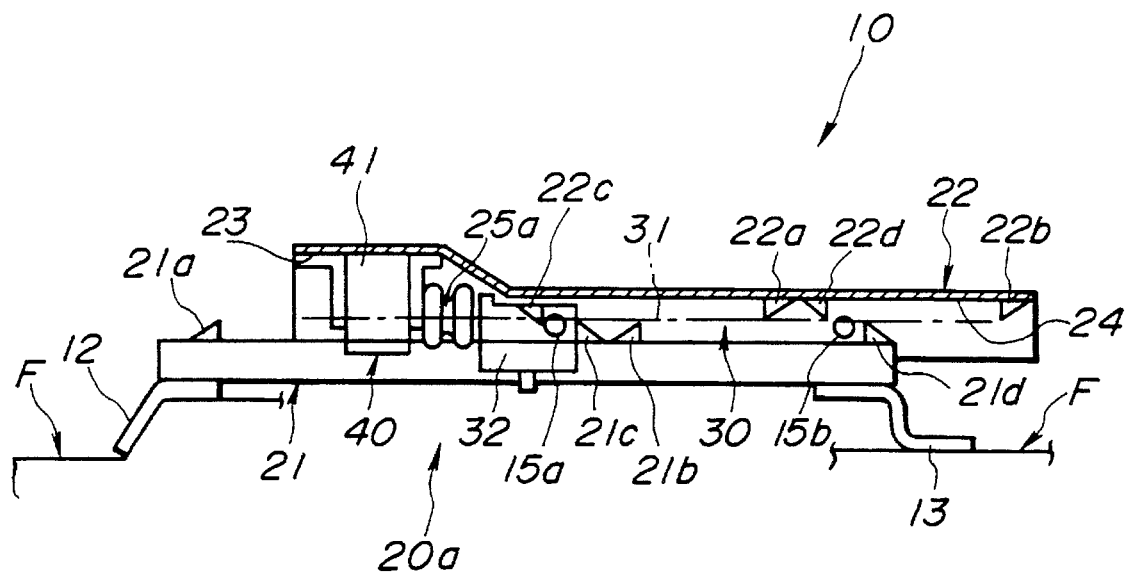
FIG. 1 is a partially sectioned side view of a power seat slide device of the present invention.
Figure 2:
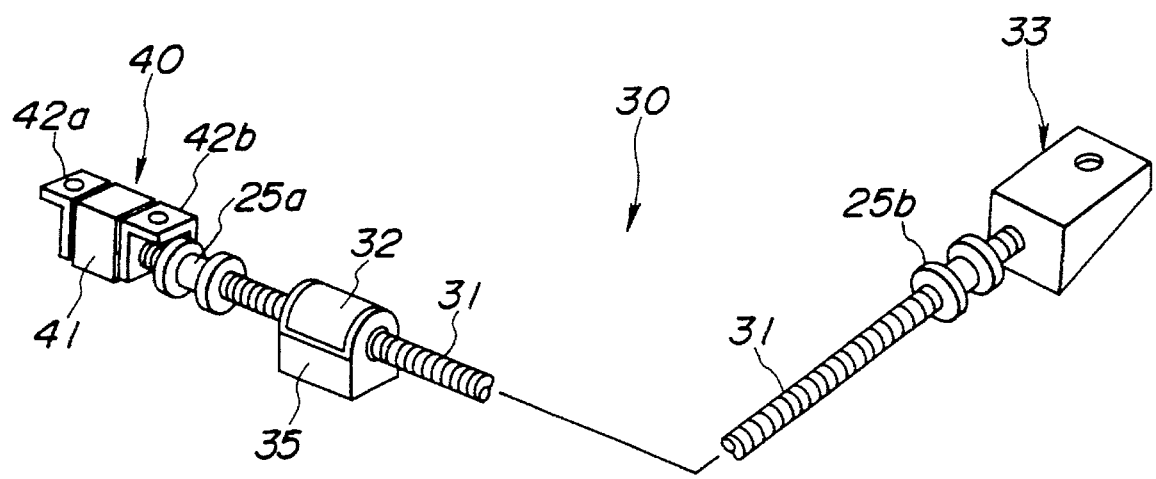
FIG. 2 is a perspective view of a drive mechanism employed in the present invention.
Figure 3:
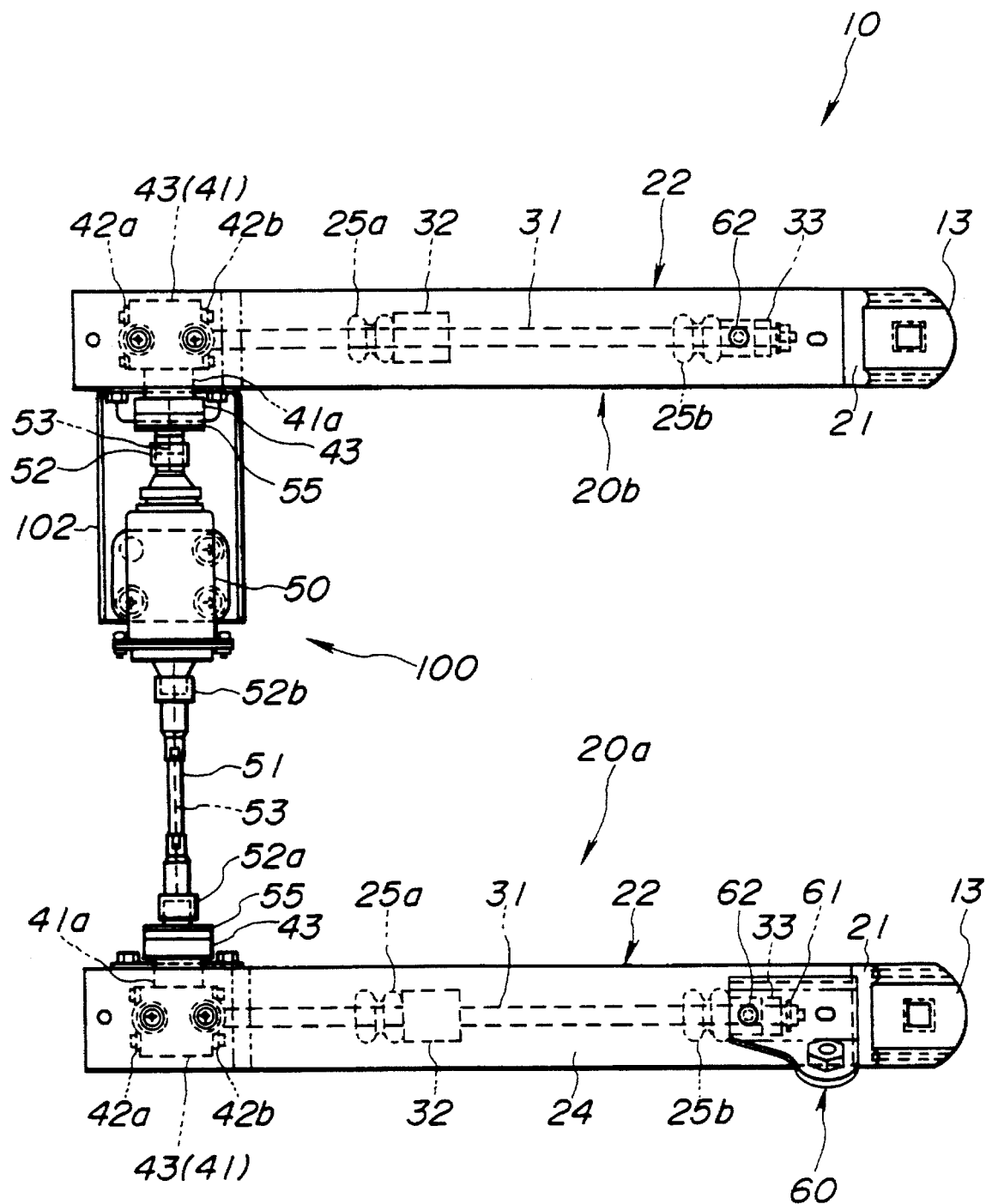
FIG. 3 is a plan view of the power seat slide device of the present invention.

Referring to FIGS. 1 to 5, particularly FIG. 3, there is shown a power seat slide device according to the present invention, which is generally designated by numeral 20.

As is seen from FIG. 3, the power seat slide device 20 comprises generally two rails units 20a and 20b which are powered by a common electric power device 100.

Since the two rail units 20a and 20b are substantially the same in construction, only one of the units (that is, the left rail unit 20a shown in FIG. 3) will be described in detail in the following for facilitation of the description.

As is understood from FIG. 1, the rail unit 20a (or 20b) comprises a lower rail 21 which is mounted to a vehicle floor "F" through front and rear leg members 12 and 13, and an upper rail 22 which is slidably engaged with the lower rail 21. Although not shown in the drawings, a seat is mounted on the upper rail 22 to move therewith.

Both the rails 21 and 22 are of a channel construction. These channel-like rails 21 and 22 are coupled having their open sides mated with each other. Front and rear rollers 15a and 15b are put between the lower and upper rails 21 and 22 to smooth a fore-and-aft movement of the upper rail 22 relative to the lower rail 21.

For the reason which has been mentioned in the part of the prior art, the lower rail 21 has first and second spaced front stoppers 21a and 21b and first and second spaced rear stoppers 21c and 21d secured thereto, and similar to this, the upper rail 22 has first and second spaced front stoppers 22a and 22b and first and second spaced rear stoppers 22c and 22d secured thereto. However, as will be apparent hereinafter, these stoppers function to suppress an excessive forward or rearward movement of the upper rail 22 relative to the lower rail 21, which would occur when an abnormally big force is applied to the upper rail 22 due to a vehicle collision or the like.

Within an elongate space defined between the coupled lower and upper rails 21 and 22, there is installed a drive mechanism 30 which functions to move the upper rail 22 relative to the lower rail 21 with an aid of electric power.

As is seen from FIG. 2, the drive mechanism 30 generally comprises an elongate threaded bolt member 31 which extends in and along the elongate space and a nut member 32 which is meshed with the bolt member 31.

The bolt member 31 has a front end incorporated with a speed reduction device 40 which is mounted to a front portion of the upper rail 22. The speed reduction device 40 is installed in a housing 41 which is fixed through two brackets 42a and 42b to a raised front part 23 of a horizontal wall 24 of the upper rail 22, as is understood from FIG. 1. A rear end of the bolt member 31 is rotatably held by a bearing member 33 which is fixed to a rear portion of the horizontal wall 24 of the upper rail 22.

As is seen from FIG. 2, the nut member 32 is unmovably housed in a housing 35 which is fixed to the lower rail 21. Although not shown in the drawings, the nut member 32 has a lower end which abuts against a horizontal wall of the lower rail 21.

Although not shown in the drawings, the speed reduction device 40 has in the housing 41 a worm and a worm wheel which are operatively meshed with each other. The worm wheel is coaxially connected to the front end of the bolt member 31 to rotate therewith. As is seen from FIG. 3, the housing 41 has a tubular portion 41a which projects toward the other rail unit 20b from the raised front part 23 of the upper rail 22. The worm of the speed reduction device 40 is received in the tubular portion 41a and powered by the electric power device 100 in such a manner as will be described hereinafter.

As is seen from FIG. 2, the bolt member 31 has front and rear shock absorbing members 25a and 25b slidably mounted thereon. The front shock absorbing member 25a is arranged between the speed reduction device 40 and the nut member 32, and the rear shock absorbing member 25b is arranged between the nut member 32 and the bearing member 33.

Figure 4:
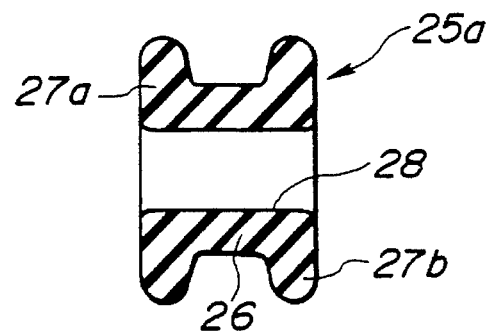
FIG. 4 is a sectional view of a shock absorbing member used in the present invention.
Figure 5:
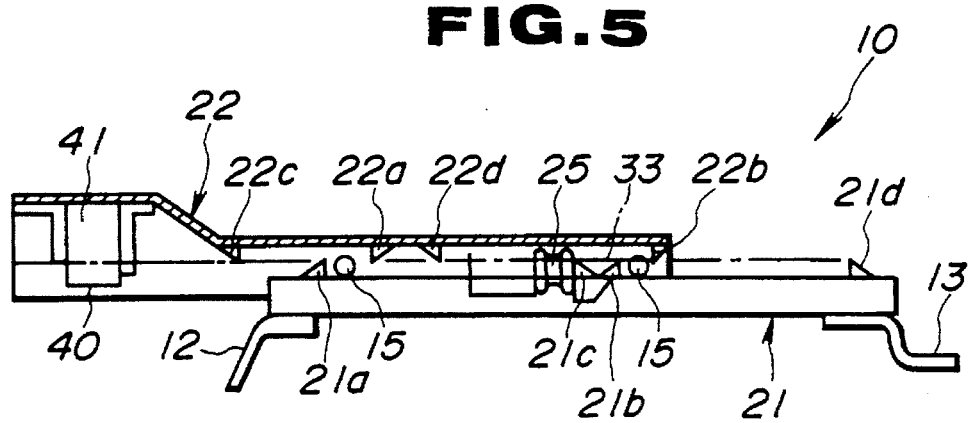
FIG. 5 is a view similar to FIG. 1, but showing a different condition of the power seat slide device.
Figure 6:
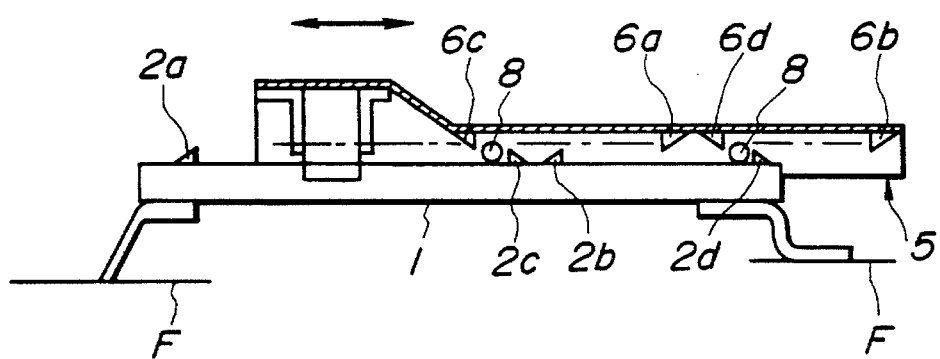
FIG. 6 is a view similar to FIG. 1, but showing a conventional power seat slide device.

As is shown in FIG. 4, each shock bearing member 25a (or 25b) is a double-flanged cylindrical member constructed of an elastomeric material, such as rubber, soft plastic or the like. That is, the shock absorbing member 25a comprises a cylindrical core portion 26 and two circular flange portions 27a and 27b formed on front and rear ends of the core portion 26. The shock absorbing member 25a is formed with a through bore 25 through which the bolt member 31 passes.

As will be understood from FIG. 1, when the upper rail 22 moves rearward and finally comes to its rearmost position relative to the lower rail 21, the housing 41 of the speed reduction device 40 presses the front shock absorbing member 25a against the nut member 32 (more specifically, the housing 35 of the nut member 32). Due to compression of the front shock absorbing member 25a, any shock which would be produced when the upper rail 22 comes to the rearmost position is absorbed or damped. Furthermore, as is seen from FIG. 5, when the upper rail 22 moves forward and finally comes to its frontmost position relative to the lower rail 21, the bearing member 33 presses the rear shock absorbing member 25b against the nut member 32 (more specifically, the housing 35 of the nut member 32). Due to compression of the rear shock absorbing member 25b, any shock which would be produced when the upper rail 22 comes to the frontmost position is absorbed or damped.

It is to be noted that when, due to a vehicle collision or the like, an abnormally big force is applied to the upper rail 22, the shock absorbing member 25a or 25b is excessively compressed to such a degree that the stoppers 21a, 21b, 21c and 21d of the lower rail 21 and the stoppers 22a, 22b, 22c and 22d of the upper rail 22 exhibit their stopping function.

As is seen from FIG. 3, the tubular portion 41a of the housing 41 of the speed reduction device 40 has an enlarged head portion 43 which is closed by an apertured cap 55. The worm (not shown) installed in the housing 41 is driven by an electric motor 50 through a flexible wire 53. Thus, the electric motor 50 and the flexible wire 53 constitute the electric power device 100. The flexible wire 53 is housed in a pipe member 51 which extends between a cap 55 for the enlarged head portion 43 of the housing 41 and the electric motor 50. That is, the pipe member 51 has one end fixed through a connecting nut 52a to the cap 55 for the enlarged head portion 43 and the other end fixed through another connecting nut 52b to a body of the electric motor 50.

As is understood from FIG. 3, the other flexible wire 53 for transmitting the power of the electric motor 50 to the other rail unit 20b is very short. Thus, the housing structure for receiving the short flexible wire 53 is also short in length. Designated by numeral 102 is a support plate on which the electric motor 50 is mounted. The base plate 50 is secured through bolts to the upper rail 22 of the other rail unit 20b. It is thus to be noted that the two upper rails 22 of the left and right rail units 20a and 20b and the electric motor 50 can move like a single unit.

As is shown in FIG. 3, the upper rail 22 of the left rail unit 20a is equipped at its rear end with an anchor member 60 for a seat belt (not shown). Designated by numerals 61 and 62 are rivets for fixing the anchor member 60 to the upper rail 22.

In the following, operation of the power seat slide device 10 of the invention will be described with reference to the drawings, particularly FIG. 3.

When the electric motor 50 is energized to run in one direction, the power of the motor 50 is transmitted through the flexible wires 53 and the speed reduction devices 43 to the bolt members 31 to rotate the same at a reduced speed. Due to the rotation, each bolt member 31 is longitudinally moved relative to the stationary (or fixed) nut member 32, so that the upper rails 22 and thus the seat (not shown) mounted thereon are moved forward or rearward relative to the stationary lower rails 21. When the seat comes to a desired position, the electric motor 50 is deenergized.

While, when the electric motor 50 is kept energized, the forward or rearward movement of the upper rails 22 is continued until these rails 22 come to their frontmost or rearmost positions. During the movement of the upper rails 22, the front and rear shock absorbing member 25a and 25b of each rail unit 20a or 20b are moved together with the bolt member 31.

When, as is seen from FIG. 1, the upper rails 22 come to their rearmost positions, the housing 41 of the speed reduction device 40 of each rail unit 20a or 20b presses the front shock absorbing member 25a against the stationary nut member 32. While, as is seen from FIG. 5, when the upper rails 22 come to their frontmost positions, the bearing member 33 of each rail unit 20a or 20b presses the rear shock absorbing member 25b against the stationary nut member 32. As has been described hereinafore, due to the compression of the shock absorbing member 25a or 25b, any shock which would be produced when the upper rails 22 come to their frontmost or rearmost positions is absorbed or at least damped. Furthermore, since the frontmost or rearmost positioning of both the upper rails 22 of the left and right rail units 20a and 20b is effected having the shock absorbing members 25a or 25b elastically compressed, the inevitable slight unsymmetrization between the two rails units 20a and 20b is lightened, which eliminates or at least minimizes the undesired sway of the seat at the frontmost or rearmost position.

Although the above description is directed to an arrangement wherein the bolt member 31 is carried by the upper rail 22 and the nut member 32 is fixed to the lower rail 21, another arrangement is also available in the present invention wherein the bolt member 31 is carried by the lower rail 21 and the nut member 32 is fixed to the upper rail 22. In this case, the bolt member 31 is suppressed from moving in an axial movement on the lower rail 21 and the electric motor 50 is mounted on the vehicle floor "F".

It is to be noted that the present invention is not limited to the specific description above or specific figures shown, but may be used in other ways without departure from its spirit as defined by the following claims.

What is claimed is:

1. A power seat slide device comprising:

first and second rail units each including a lower rail secured to a fixed member and an upper rail slidably engaged with the lower rail, the Upper rails of said first and second rail units carrying thereon a seat;

two threaded bolt members respectively incorporated with said first and second rail units, each threaded bolt member being rotatably carried by one of said lower and upper rails through first and second supporting members;

two nut members respectively incorporated with said first and second rail Units, each nut member being connected to the other of said lower and upper rails and meshed with said threaded bolt member so that rotation of said threaded bolt member about its axis induces a longitudinal movement of said upper rail relative to said lower rail;

an electric power device for rotating both the threaded bolt members of said first and second rail units with an aid of electric power;

two first shock absorbing members respectively incorporated with said first and second rail units, each first shock absorbing member being slidably mounted on the threaded bolt member between said first supporting member and said nut member; and two second shock absorbing members respectively incorporated with said first and second rail units, each second shock absorbing member being slidably mounted on the threaded bolt member between said second supporting member and said nut member, wherein each of said first and second shock absorbing members comprises an elastomeric material and is shaped like a bobbin including a cylindrical core portion and two circular flange portions formed on front and rear ends of said cylindrical core portion.

2. A power seat slide device as claimed in claim 1, in which each cylindrical core portion includes a through bore.

3. A power seat slide device as claimed in claim 1, further comprising at least one stopper secured to one of the upper and lower rails which suppresses an excessive movement of said upper rail relative to said lower rail when one of said first and second shock absorbing members is excessively compressed.

4. A power seat slide device as claimed in claim 1, in which said bolt member is carried by said upper rail and said nut member is fixed to said lower rail, and in which said first supporting member comprises a housing containing a speed reduction device through which speed reduction device the power of said electric power device is transmitted to said threaded bolt members.

5. A power seat slide device as claimed in claim 4 in which said electric power device is seated on a support plate which is fixed to said upper rail.

6. A power seat slide device as claimed in claim 5, in which said second supporting member is a bearing member which rotatably supports one end of said bolt member, said bearing member being fixed to said upper rail.

7. A power seat slide device comprising:

left and right rail units, each including a lower rail secured to a fixed member and an upper rail slidably engaged with said lower rail, the upper rails of said left and right rail units carrying thereon a seat;

two threaded bolt members respectively incorporated with said left and right rail units, each threaded bolt member being rotatably carried by one of said lower and upper rails through first and second supporting members;

two nut members respectively incorporated with said left and right rail units, each nut member being connected to the other of said lower and upper rails and meshed with said threaded bolt member so that rotation of said threaded bolt member about its axis induces a longitudinal movement of said upper rail relative to said lower rail;

two first shock absorbing members respectively incorporated with said left and right rail unit, each first shock absorbing member being slidably mounted on said threaded bolt member between said first supporting member and said nut member; and two second shock absorbing members respectively incorporated with said left and right rail units, each second shock absorbing member being slidably mounted on said threaded bolt member between said second supporting member and said nut member, wherein each of said first and second shock absorbing members comprises an elastomeric material and is shaped like a bobbin including a cylindrical core portion and two circular flange portions formed on front and rear ends of said cylindrical core portion; and a single electric power device for rotating the bolt members of said left and right rail units with an aid of electric power.

8. A power seat slide device as claimed in claim 7, in which each cylindrical core portion includes a through bore.

9. A power seat slide device as claimed in claim 7, further comprising pipe members housing respective flexible wires, wherein said electric power device rotates said bolt members through the flexible wires which are housed in the respective pipe members.

10. A power seat slide device as claimed in claim 9, in which said electric power device is seated on a support plate which is fixed to the upper rail of one of said left and right rail units.

* * * * *